United States Patent Office 3,436,394
Patented Apr. 1, 1969

3,436,394
PROCESS FOR THE PRODUCTION OF 2,4-ALKYLAMINO-6-CHLORO-s-TRIAZINES
George A. Saul, Mobile, Ala., assignor to Geigy Chemical Corporation, Ardsley, N.Y., a corporation of New York
No Drawing. Filed Mar. 20, 1967, Ser. No. 624,199
Int. Cl. A01n 5/00; C07d 55/20
U.S. Cl. 260—249.8
16 Claims

ABSTRACT OF THE DISCLOSURE 2,4-alkylamino-6-chloro-s-triazines are prepared by reacting cyanuric chloride with lower primary or secondary alkyl amines followed by the addition of anhydrous ammonia to the system as an acid binding agent. The reactants are used in essentially stoichiometric amounts. The reactions are effected at low-to-moderate temperatures in essentially anhydrous, organic media inert to the reactants. An illustrative embodiment is the reaction of cyanuric chloride with monoisopropylamine in trichloroethylene using anhydrous ammonia as acid binding agent to yield 2,4-bis-isopropylamino-6-chloro-s-triazine.

BACKGROUND OF THE INVENTION
FIELD OF THE INVENTION

The invention relates to a process for the production of 2,4-alkylamino-6-chloro-s-triazines by way of partial amination of cyanuric chloride, and more particularly it relates to the production of 2,4-alkylamino-6-chloro-s-triazines by reacting cyanuric chloride with two moles of lower primary or secondary alkyl amines and introducing into the reaction system still containing reactive chlorotriazine and amine hydrochloride stoichiometric amounts of anhydrous ammonia. The introduction of anhydrous ammonia into the system, preferably following the addition of the respective amine, generates free amine from its corresponding hydrochloride, which in turn further reacts with the reactive chlorotriazine. By reactive chlorotriazine are meant unreacted cyanuric chloride and mono-alkylamino-dichloro-s-triazines, respectively.

The fact that ammonia can be used as an acid binding agent in systems containing reactive chlorotriazines and lower primary or secondary alkyl amine hydrochlorides without formation of large quantities of the corresponding amino-chloro-s-triazines or melamines is not predictable, especially in view of the well known fact that these products are readily formed by reaction of reactive chlorotriazines and ammonia. It is surprising that in the presence of lower alkyl amine hydrochlorides ammonia reacts preferentially with these materials rather than with the reactive chlorotriazines.

2,4-alkylamino-6-chloro-s-triazines inhibit the growth of plants and are widely used as herbicides. Especially valuable commercial herbicides are atrazine (2-ethylamino-4-isopropylamino-6-chloro-s-triazine), simazine (2,4-bis-ethylamino-6-chloro-s-triazine), propazine (2,4-bis-isopropylamino-6-chloro-s-triazine), ipazine (2-diethylamino-4-isopropylamino-6-chloro-s-triazine) etc., which are employed both as selective herbicides for weed control among cultivated plants and as soil sterilants for the total elimination of undesired plant growth.

DESCRIPTION OF THE PRIOR ART

A presently used commercial process of preparing 2,4-alkylamino-6-chloro-s-triazines is described in U.S. Patent No. 2,891,855 in the name of Hans Gysin and Enrico Knüsli. In this process finely divided solid cyanuric chloride in suspension in an aqueous medium is reacted with an equivalent amount of a primary or secondary amine in the presence of an alkaline substance at a temperature of 0–5° C. and the 2-alkylamino-4,6-dichloro-s-triazine obtained is further reacted with an equivalent amount of the same or a different primary or secondary amine and an alkaline substance, at temperatures up to 50° C.

This prior art process is an aqueous batch process which cannot be carried out on a continuous basis and, for best results, involves essentially four separate steps, namely (1) substitution of the first chlorine atom of the solid cyanuric chloride by an amine group, (2) removal of the hydrochloric acid formed by means of an alkaline substance as an acid acceptor, (3) substitution of the second chlorine atom of the cyanuric chloride by the same or a different amino group, and (4) again removal of the hydrochloric acid then formed by means of an alkaline substance. Due to the heterogeneity of the reaction mass (solid-liquid slurry), the reactions proceed at a very slow rate and for this reason as well as for the fact that four steps are involved, undesirably long times are required for the reactions to be completed.

The yields of the end products in the above process are considerably influenced by the pH of reaction mixture. The pH must be accurately controlled to avoid excessive hydrolysis of the cyanuric chloride. The use of aqueous solutions of sodium hydroxide, sodium carbonate, or sodium bicarbonate has disadvantages in a process employing water-miscible solvents which are difficult to recover in high yield and purity and also tends to give rise to unwanted hydrolytic by-products with attendant loss of yield.

Another art procedure for the prevention of excessive hydrolysis of cyanuric chloride utilizes two moles of amine for each atom of chlorine to be replaced. The disadvantage of this procedure lies in the recovery of the amine from the amine hydrochloride formed in the reaction, which operation is troublesome, time-consuming and expensive.

The use of a low-cost hydrogen chloride scavenger which need not be recovered and inexpensive easy-to-recover solvents, is essential to the successful commercial production of the subject class of compounds. Another essential condition is the avoidance of hydrolytic losses by proceeding in a substantially anhydrous system.

SUMMARY OF THE INVENTION

The present invention relates to a process of overcoming the disadvantages described above by carrying out the reaction of cyanuric chloride with lower primary or secondary alkyl amines with the use of anhydrous ammonia as an acid binding agent. This process offers high conversions of the reactants, easy adaptability to continuous operation, simple recovery of solvents, and excellent yields of high quality product. The only significant by-products obtained are small percentages of 2-alkylamino-4-amino-6-chloro-s-triazines which have themselves been shown to have herbicidal activity.

DETAILED DESCRIPTION OF THE INVENTION

In the process for the preparation of compounds of the formula

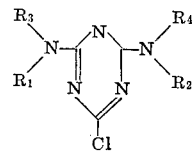

wherein
$R_1$ and $R_2$ represents lower alkyl, and
$R_3$ and $R_4$ represent hydrogen or lower alkyl, two different procedures are used.

In the first procedure designed primarily for the preparation of 2,4-alkylamino-6-chloro-s-triazines containing two different amino moieties it is contemplated that the anhydrous ammonia be added following the addition of one molecular proportion of lower primary or secondary alkyl amine per each atom of chlorine to be replaced. The ammonia may also be added along with the amine, but an excess of the ammonia should be avoided during the addition. In the first procedure, for example, a solution of cyanuric chloride in an inert medium is prepared from solid cyanuric chloride or, preferably, is produced directly from an absorption system of a cyanuric chloride production unit using said inert medium as absorbent. To the well agitated solution a lower primary or secondary alkyl amine is added followed by the addition of anhydrous ammonia. As is set forth in more detail below the introduction of amine and ammonia is effected at temperatures and in amounts which are appropriate and necessary for the substitution of a first chlorine atom by alkylamino in the cyanuric chloride molecule. Subsequently a different lower primary or secondary alkyl amine and thereafter anhydrous ammonia are added to the agitated system in amounts and at temperatures suitable and necessary for the substitution of a second chlorine atom by alkylamino in the triazine moiety as is explained hereinafter in more detail. It is, of course, also possible to use in the above described reaction steps identical lower primary or secondary alkyl amines in order to obtain a 2,4-alkylamino-6-chloro-s-triazine containing two identical amino moieties although this modification provides no special advantage over a second procedure which is especially suitable for this purpose.

In the second procedure designed primarily for the preparation of 2,4-alkylamino-6-chloro-s-triazine containing two identical amino moieties the addition of approximately two moles of lower primary or secondary alkyl amine per mole of cyanuric chloride followed by the addition of two moles of anhydrous ammonia is employed. In this procedure the addition of the desired lower primary or secondary alkyl amine and thereafter the introduction of anhydrous ammonia to the agitated cyanuric chloride solution (which is produced as described above) are effected at temperatures and in amounts suitable and necessary for the substitution of two chlorine atoms by alkylamino in the cyanuric chloride molecule as is set forth in more detail below.

The reaction mixtures obtained according to the above described procedures are worked-up in a conventional manner. In case of using, for example, a water-immiscible solvent, such as trichloroethylene and the like, water is added to the reaction mixture, the solvent recovered by azeotropic distillation, the slurry of product in water is cooled, filtered, the product on the filter washed with water and subsequently dried.

The reaction steps as described in both procedures of the process according to the invention are readily combined to give a continuous process; the reaction, however, may also be carried out in a batchwise manner.

Both procedures use approximately stoichiometric quantities of suitable amines in the reaction with the reactive chlorotriazines; the amine hydrochlorides thereby formed are converted to the amines for completion of the reaction of the reactive chlorotriazines with said amines to the desired product by addition of anhydrous ammonia to the system in approximately stoichiometric quantities. The molar quantity of the amine reactant(s) can thus be approximately equivalent to the halogen to be displaced and the molar quantity of ammonia can be in the same order of magnitude. Variations from the stoichiometric amounts of amine(s) and ammonia offer no practical advantage though slight excesses of either or both are permissible.

In both procedures water-immiscible organic solvents, such as toluene, chlorobenzene, perchloroethylene, trichloroethylene or chloroform are utilized as inert reaction media. The invention is, however, not limited thereto and the use of water-miscible solvents, such as acetone or methyl ethyl ketone may also be contemplated though the utilization of these media provides no advantage over the use of water-immiscible solvents. The solvents should be present in the system in such quantity as to permit suitable agitation.

It is preferable to carry out the reaction under anhydrous conditions though there is no disadvantage of the presence of minute amounts of water in the reaction mixture. The temperatures at which the reactions are effected are low-to-moderate and subject to wide variation. Generally the temperature in the first chlorine substitution is somewhat lower than in the second chlorine substitution but may be the same in both. The first chlorine atom of cyanuric chloride is, preferably, replaced at −5° C. to +5° C., although temperatures of −20° C. to +50° C. are applicable and even temperatures outside this range may be employed. A preferred temperature range for the reaction of the second chlorine atom of cyanuric chloride is from about 20° C. to about 60° C., although the reaction may be carried out also within a range of from about 10° C. to about 90° C. The optimum temperature ranges for both steps are, however, dependent upon the nature of the amine being employed.

The reaction step involving the addition of the acid binding agent to the system is, preferably, carried out by passing anhydrous ammonia below the surface of the agitated reaction mixture. The time of addition of the amine(s) and the ammonia may be as fast as consistent with the temperature control desired, providing adequate dispersion of the amines and ammonia is achieved. Loss of the volatile amines and ammonia is to be avoided in the processing.

The term lower alkyl as used herein per se means saturated monovalent aliphatic radicals of the general formula —$C_mH_{2m+1}$ wherein $m$ designates an interger of less than 5 and is inclusive for radicals such as methyl, ethyl, n-propyl, isopropyl, n-butyl, isobutyl, sec. butyl and t-butyl. The term alkylamino stands for (lower)alkylamino and di(lower)alkylamino.

The following examples are given as illustrative of the process which is not limited to the specific details set forth. Parts and percentages throughout are by weight.

EXAMPLE 1

2,4-bis-isopropylamino-6-chloro-s-triazine

Into a 2 liter resin flask equipped with an agitator was charged 92.2 g. (0.5 mol) of cyanuric chloride and 694 g. of trichloroethylene. The mixture was agitated at room temperature until substantially all of the cyanuric chloride had dissolved. Anhydrous monoisopropylamine (63.1 g., 1.069 mol) was added dropwise with agitation. Temperature was controlled substantially at 30–40° C. during the monoisopropylamine addition. Following an agitation period of fifteen minutes, anhydrous ammonia (27 g., 1.59 mole) was passed under the surface of the agitated reaction mixture over a period of one hour with the temperature being allowed to rise slowly to ca. 50° C. Following a fifteen minute additional reaction period, five hundred grams of water was added, and the trichloroethylene was recovered by azeotropic distillation. The slurry of product in water was cooled to 40° C., filtered, and washed on the filter with two 150 gram portions of water. Following drying, 114.2 g. of 2,4-bis-isopropylamino-6-chloro-s-triazine of 99.5% purity was obtained, a yield of 99% of theory. The product melted 214.5–215° C. (uncorr.) and the melting point of a mixture of the product and an authentic sample was not depressed.

The preparation of 2,4-bis-isopropylamino-6-chloro-s-triazine substantially as above but using monochlorobenzene as a solvent was accomplished in quantitative yield.

EXAMPLE 2

2-ethylamino-4-isopropylamino-6-chloro-s-triazine

Into a 2 liter resin flask equipped with an agitator and a thermometer was charged 1400 g. of trichloroethylene and 184.4 g. (1 mol) of cyanuric chloride. 59.1 g. (1 mol) of monoisopropylamine was added dropwise to the agitated solution at −7° C. to 0° C. over a thirty minute period. Anhydrous ammonia (17 g., 1 mol) was passed under the surface of the agitated reaction mixture over a thirty minute period at 0° C. to 5° C. Anhydrous monoethylamine (46.0 g., 1.02 mol) was passed under the surface of the agitated reaction mixture over a one hour period during which time external cooling was lessened so as to permit the temperature to rise from 15° C. to 40° C. Finally, anhydrous ammonia in excess of 17.3 g. (1.02 mol) was added below the surface at 40° C. to 55° C. over a thirty minute period. During this last addition, 300 g. more trichloroethylene was added to thin the slurry and to permit adequate agitation. Water was added, trichloroethylene was distilled off for recovery, and the product was filtered, water-washed and dried. Yield of the 2,4-diamino-6-chloro-s-triazines obtained was 202.7 g. Assay by the chloride method (normally used for 2-ethylamino-4-isopropylamino-6-chloro-s-triazine) showed 99.8% purity calculated as atrazine.

Approximate product distribution as determined by gas chromatography and thin layer chromatography was

|   | Percent |
|---|---|
| 2-ethylamino-4-isopropylamino-6-chloro-s-triazine | 92 |
| 2,4-bis-isopropylamino-6-chloro-s-triazine | 6 |
| 2-amino-4-isopropylamino-6-chloro-s-triazine | 1 |
| 2-amino-4-ethylamino-6-chloro-s-triazine | 1 |

EXAMPLE 3

2-diethylamino-4-isopropylamino-6-chloro-s-triazine

Into a reactor was charged 92.2 (0.5 mole) of finely divided cyanuric chloride and 1400 g. of toluene. Anhydrous monoisopropylamino (29.6 g., 0.5 mole) was dropped onto the surface of the agitated reaction mixture at −5° C. over a forty minute period. Ammonia (8.5 g., 0.5 mole) was passed under the surface of the reaction mass at −5° C. over a forty minute period. Diethylamine (36.6 g., 0.5 mole) was dropped in over a 45 minute period at 15° C. to 20° C. followed by ammonia (8.5 g., 0.5 mole) fed under the surface over a 45 minute period. A technical grade of 2-diethylamino-4-isopropylamino-6-chloro-s-triazine was obtained in 96% yield by filtering, water washing, and recovering more residual product from the solvent by distillation.

EXAMPLE 4

2-amino-4-isopropylamino-6-chloro-s-triazine

To illustrate the reactivity of cyanuric chloride with ammonia in the absence of a hydrochloride of a strong aliphatic amine, the following experiment was made.

In an appropriately agitated flask was charged 1400 g. of trichloroethylene and 92.2 g. (0.5 mole) of finely divided cyanuric chloride. Ammonia (17 g., 1.0 mole) was sparged under the surface of the agitated mixture at 0° C. to 5° C. over a one hour period. Monoisopropylamine (59.1 g., 1.0 mole) was then added over a one-hour period at 40° C. to 50° C. Following water washing, the solvent was removed by distillation leaving 94 g. of product identified as 2-amino-4-isopropylamino-6-chloro-s-triazine by thin layer chromatography. Analysis of the product by elemental chloride techniques showed an assay of 94.6%. 4.6% of ammonium chloride and 0.2% of water were also reported. Yield based on assay and crude product weight was 94.7% of theory.

EXAMPLE 5

2-ethylamino-4-isopropylamino-6-chloro-s-triazine

To a stirred mixture of 900 g. of anhydrous methyl ethyl ketone and 184.4 g. (1 mole) of cyanuric chloride was added 59.1 g. (1 mole) of anhydrous isopropylamine over a thirty minute period at −7° C. to 0° C. Ammonia (17 g., 1 mole) was passed into the mixture over a thirty minute period at 0° C. Anhydrous monoethylamine (45.1 g., 1 mole) was passed into the mixture over a one hour period at 20° C. to 38° C. followed by ammonia (17 g., 1 mole) over a thirty minute period at 40° C. to 55° C. Solvent was removed by distillation, the product was triturated with water to remove inorganic salts, filtered and dried at 50° C. The 202 g. of product contained 2 g. of ammonium chloride and water; the remaining 200 g. consisted of

|   | G. |
|---|---|
| 2,4-bis-isopropylamino-6-chloro-s-triazine | 29.4 |
| 2-ethylamino-4-isopropylamino-6-chloro-s-triazine | 164.8 |
| Two 2-amino-4-alkylamino-6-chloro-s-triazines | 5.8 |

Yield of the first two products (194.2 g.) expressed in atrazine is 90.6%.

EXAMPLE 6

2-ethylamino-4-isopropylamino-6-chloro-s-triazine

A typical atrazine run involves:

| Reactants and solvent | Gram moles | Grams charged | Conditions of additions |
|---|---|---|---|
| Trichloroethylene | | 2,000 | Charged to reactor first. |
| Cyanuric chloride | 0.5 | 92.2 | At room temperature. |
| Monosiopropylamine anh. | 0.5 | 29.6 | At −5° C. for 40 minutes. |
| 1st Ammonia charge | 0.5 | 8.5 | Do. |
| Monoethylamine anh. | 0.5 | 23.0 | First 2% at 0° C.; rest at 30° C. to 35° C. over 1 hour. |
| 2nd Ammonia charge | 0.5 | 8.5 | At 40° C. for 40 minutes. |

The reaction product was worked up in similar fashion to Example 1. 106.2 g. of product were obtained, containing only 0.3 g. of ammonium chloride and water. The 105.9 g. of organic product were analyzed by gas chromatography and thin layer chromatography and found to consist of the following:

|   | G. |
|---|---|
| 2,4-bis-isopropylamino-6-chloro-s-triazine | 1.7 |
| 2-ethylamino-4-isopropylamino-6-chloro-s-triazine | 103.3 |
| 2,4-bis-ethylamino-6-chloro-s-triazine | 0.7 |
| 2-amino-4-isopropylamino-6-chloro-s-triazine | 0.2 |

The yield based on the first three compounds expressed as atrazine is 98.1%. The formation of the 2-amino derivative is held to about less than 0.2% of the total triazines obtained.

What is claimed is:

1. The process for the production of 2,4-alkylamino-6-chloro-s-triazines having the formula

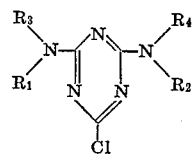

in which
  $R_1$ and $R_2$ represent lower alkyl, and
  $R_3$ and $R_4$ represent hydrogen or lower alkyl,
which comprises
  (a) adding to a solution of cyanuric chloride in an inert, organic medium a lower primary or secondary alkyl amine in an amount appropriate for the replacement of one chlorine atom by alkylamino in said cyanuric chloride,
  (b) introducing in the resulting reaction mixture anhydrous ammonia in an amount necessary to complete the reaction of cyanuric chloride and the lower primary or secondary alkyl amine, (c) adding to the resulting reaction mixture containing a mono-alkylamino-dichloro-s-triazine a lower primary or secondary alkyl amine in an amount appropriate for the replacement of one chlorine atom by alkylamino in said mono-alkylamino-dichloro-s-triazine, and (d) introducing in the resulting reaction mixture anhydrous ammonia in an amount necessary to complete the reaction of the mono-alkylamino-dichloro-s-triazine and the lower primary or secondary alkyl amine, and (e) recovering the 2,4-alkylamino-6-chloro-s-triazine obtained.

2. The process of claim 1 in which in steps (a), (b), (c) and (d) the lower primary or secondary alkyl amine and the anhydrous ammonia are used in stoichiometric proportions.

3. The process of claim 1 in which the lower primary or secondary alkylamine and the anhydrous ammonia are used in steps (a) and (b) in stoichiometric proportions, and in steps (c) and (d) in amounts exceeding stiochiometric proportions.

4. The process of claim 1 in which in steps (a), (b), (c) and (d) the inert organic medium is anhydrous.

5. The process of claim 4 in which said medium is water-immiscible.

6. The process of claim 1 in which steps (a) and (b) are performed at temperatures ranging from −20° C. to 50° C., and steps (c) and (d) are performed at temperatures ranging from 10° C. to 90° C.

7. The process of claim 1 in which the additions of the lower primary or secondary alkyl amines in steps (a) and (c) are effected concommittently with the introduction of anhydrous ammonia.

8. The process of claim 7 in which in said operation stoichiometric amounts of reactants are used.

9. The process of claim 7 in which said operation is carried out in an anhydrous medium.

10. The process of claim 9 in which said medium is water-immiscible.

11. The process of claim 1 in which the amino moieties

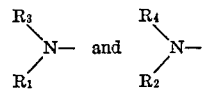

in said formula are identical and which comprises (a) adding to a solution of cyanuric chloride in an inert, organic medium a lower primary or secondary alkyl amine in an amount appropriate for the replacement of two chlorine atoms by alkylamino in said cyanuric chloride, and (b) introducing in the resulting reaction mixture anhydrous ammonia in an amount necessary to complete the reaction of cyanuric chloride and the lower primary or secondary alkyl amine, and recovering the 2,4-alkylamino-6-chloro-s-triazine obtained.

12. The process of claim 11 in which in steps (a) and (b) the lower primary or secondary alkyl amine and the anhydrous ammonia are used in stoichiometric proportions.

13. The process of claim 11 in which in steps (a) and (b) the lower primary or secondary alkyl amine and the anhydrous ammonia are used in amounts exceeding stoichiometric proportions.

14. The process of claim 11 in which steps (a) and (b) the inert organic medium is anhydrous.

15. The process of claim 14 in which said medium is water-immiscible.

16. The process of claim 11 in which steps (a) and (b) are performed at temperatures ranging from 10° C. to 90° C.

References Cited

UNITED STATES PATENTS 3,326,912 6/1967 Yamamoto et al. ____ 260—249.8
3,326,914 6/1967 Knusli et al. _____ 260—249.8

HENRY R. JILES, *Primary Examiner.*

JOHN M. FORD, *Assistant Examiner.*

U.S. Cl. X.R.

71—93